UNITED STATES PATENT OFFICE 2,368,765

COMPOSITION OF MATTER

Robert W. Lawrence, Wilmington, Del., assignor to Hercules Powder Company, Wilmington, Del., a corporation of Delaware No Drawing. Application October 28, 1941, Serial No. 416,866

6 Claims. (Cl. 260—475)

This invention relates to new ester-type plasticizing agents, and in particular concerns certain esters of nitro-isobutyl alcohol and improved cellulose derivative plastic compositions comprising the same.

Although it has been proposed that esters of certain nitro-alcohols be employed as plasticizing agents for various cellulose derivatives, the nitro-alcohol esters heretofore available have not proved entirely satisfactory for such purposes. For example, certain of such esters have poor light-stability, with the result that cellulose derivative compositions into which they have been incorporated show marked discoloration upon aging. Others of the available nitro-alcohol esters, e. g., those of higher molecular weight. contain the solvent nitro group in such small proportion that they do not have sufficient plasticizing action on cellulose derivatives and are not sufficiently compatible therewith. On the other hand, those of lower molecular weight have had relatively low boiling points, and gradually volatilize out of the compositions into which they have been incorporated as plasticizing agents.

It has now been found that the neutral lower molecular weight di-carboxylic acid esters of 2-methyl-2-nitro-propanol, herein termed "nitro-isobutyl alcohol," possess an unusual combination of properties which renders them eminently suited for use as plasticizing agents for various cellulose derivatives. The term "lower molecular weight di-carboxylic acid," as herein employed, will be understood to include oxalic acid and acids having the general formula:

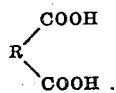

wherein R represents a neutral aliphatic or aromatic radical containing not more than eight carbon atoms, and consequently the esters provided by the invention include di-(nitro-isobutyl) oxalate and the nitro-isobutyl esters having the general formula:

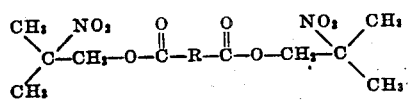

wherein R represents a neutral aliphatic or aromatic radical containing not more than eight carbon atoms. In such esters are combined the desirable properties of stability to light and heat, water-resistance, age-resistance, low-volatility, wide compatibility with various cellulose derivatives and the various modifying agents and solvents usually employed therewith, and good solvent and/or plasticizing action on such cellulose derivatives. Accordingly, the invention consists in the new nitro-isobutyl alcohol esters defined above, and in improved cellulose derivative compositions in which such esters are employed as plasticizing agents.

The following examples will illustrate several ways in which the esters of the present class have been prepared and employed as plasticizing agents for various cellulose derivatives. It will be understood, however, that such examples are presented merely in illustration of the invention, and are not to be construed as limiting the same.

*Example I*

A mixture of 120 parts by weight (1 mole) of nitro-isobutyl alcohol, 50 parts by weight (0.5 mole) of succinic anhydride and 0.1 part by weight of p-toluene sulfonic acid was heated at a temperature of about 190° C. for about 45 minutes in a flask fitted with a reflux condenser to prevent loss of the alcohol. The reacted mixture was then poured into cold water, taken up in ether, and washed several times with dilute aqueous sodium bicarbonate to remove the acid catalyst. Upon removal of the ether by evaporation, the ester product solidified as a mass of white crystals which, after recrystallization from methanol, had a melting point of about 71°–71.5° C. Di-(nitro-isobutyl) succinate has the structural formula:

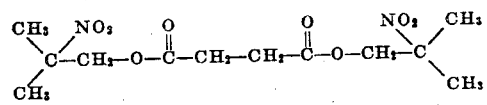

An alternative mode of procedure for preparing di-(nitro-isobutyl) succinate consists in heating chemically equivalent amounts of nitro-isobutyl alcohol and succinic acid at a temperature of about 180°–200° C. and in the presence of an esterification catalyst, after which the ester product is washed and purified by recrystallization as described above.

*Example II*

A mixture of 120 parts by weight (1 mole) of nitro-isobutyl alcohol and 74 parts by weight (1 mole) of phthalic anhydride was heated in an oil bath at a temperature of 200° C. for two hours.

Upon cooling, the reacted mixture deposited white crystals of di-(nitro-isobutyl) phthalate having a melting point of about 134°–137° C. Di-(nitro-isobutyl) phthalate has the structural formula:

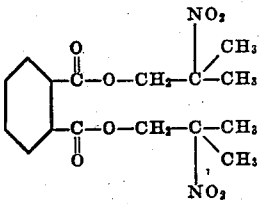

Example III

A typical cellulose acetate lacquer of the following composition:

| | Parts by weight |
|---|---|
| Cellulose acetate (52.9% acetic acid, 42 sec. viscosity) | 10 |
| Di-(nitro-isobutyl) succinate | 5 |
| Solvent (90% acetone–10% alcohol) | 85 | was prepared by dissolving the cellulose acetate and nitro-isobutyl succinate in a portion of the solvent to form a thick viscous lacquer "dope" which was then diluted with the remainder of the solvent to form a lacquer of casting consistency. The lacquer so prepared dried to form tough, water-resistant films of good clarity and flexibility.

Example IV

Approximately 100 parts by weight of cellulose acetate, 50 parts by weight of di-(nitro-isobutyl) phthalate, and 100 parts by weight of a solvent consisting of equal parts of ethanol and methylene chloride were mixed on a heated two-roll mill until substantially all of the solvent was driven off. The colloided mixture of cellulose acetate and plasticizer was then removed from the mill and was dried and ground to form a molding powder. Articles molded from this composition had excellent light-stability, and were free from surface blemishes and irregularities.

Example V

A nitrocellulose lacquer of the following composition:

| | Parts by weight |
|---|---|
| Nitrocellulose | 10 |
| Di-(nitro-isobutyl) succinate | 5 |
| Butanol | 16 |
| Butyl acetate | 16 |
| Toluene | 53 | was prepared by dissolving the di-(nitro-isobutyl) succinate in the solvent mixture, and thereafter gradually stirring in the nitrocellulose. This lacquer was of suitable consistency for spraying, and deposited tough adherent films of good flexibility.

Example VI

An ethylcellulose spraying lacquer was prepared by dissolving 120 parts by weight of ethylcellulose (47.7% ethoxyl), 20 parts by weights of nitro-isobutyl benzoate, and 10 parts by weight of di-(nitro-isobutyl) succinate in 1350 parts by weight of a mixed solvent consisting of 20 per cent by weight of butanol and 80 per cent by weight of toluene. This lacquer had excellent spraying characteristics and dried to form tough adherent films having good water-resistance and light-stability.

As will be apparent from the above examples, the nitro-isobutyl alcohol esters of the present class are preferably prepared by the simple esterification of nitro-isobutyl alcohol with a di-carboxylic acid containing not more than eight carbon atoms exclusive of the carboxyl groups or the corresponding acid anhydride, e. g., oxalic acid, succinic anhydride, maleic acid, adipic acid, phthalic anhydride, glutaric acid, sebacic acid, suberic acid, pimelic acid, azelaic acid, etc., whereby there is formed the corresponding neutral nitro-isobutyl ester, i. e., di-(nitro-isobutyl) oxalate, di-(nitro-isobutyl) succinate, di-(nitro-isobutyl) maleate, di-(nitro-isobutyl) adipate, di-(nitro-isobutyl) phthalate, di-(nitro-isobutyl) glutarate, di-(nitro-isobutyl) sebacate, di-(nitro-isobutyl) suberate, di-(nitro-isobutyl) pimelate, di-(nitro-isobutyl) azelate, etc. Such acids and acid anhydrides are available commercially or may be synthesized by known methods. Similarly, the nitro-isobutyl alcohol may be prepared by reacting 2-nitro-propane with formaldehyde in accordance with the procedure described in U. S. Patent 2,135,444.

The esterification reaction is carried out simply by heating the alcohol with an approximately chemically equivalent amount of the desired acid or acid anhydride at a temperature between about 100° and about 250° C. until reaction is complete. The crude ester product is then washed with a dilute alkali or acid and water, and is purified by fractional distillation or by crystallization from a suitable solvent. If desired, a small proportion of an esterification catalyst, such as sulfuric acid, benzene sulfonic acid, zinc chloride, etc., may be employed to reduce the time required for complete reaction to take place. Also, when the di-carboxylic acid itself is employed, the reaction may be carried out in the presence of an inert water-immiscible organic liquid in order to promote the distillation and removal of the water which is formed during the reaction as an azeotropic mixture. Such liquid also facilitates subsequent washing of the ester product and is ultimately removed during purification of the ester by fractional distillation or crystallization.

Alternatively, the nitro-isobutyl alcohol may be reacted with a di-carboxylic halide, such as malonyl chloride, succinyl bromide, phthalyl chloride, etc., to form the esters of the present class, in which case the crude product should be treated with an alkali to remove the hydrogen halide by-product.

As hereinbefore stated, the nitro-isobutyl esters of the present class are characterized by an unusual combination of chemical and physical properties which renders them eminently suited for use as plasticizing agents for the various cellulose derivatives, e. g., cellulose esters and mixed esters, such as cellulose acetate of various degrees of acetylation, cellulose propionate, cellulose acetate butyrate, cellulose acetate propionate, etc., nitrocellulose, and cellulose ethers, such as ethylcellulose, benzylcellulose, etc. For example, they are of sufficiently high molecular weight that they do not tend to volatilize out of the compositions in which they are incorporated, but at the same time their molecular weight is not so high as to render them incompatible with cellulose derivatives. Furthermore, they contain the solvent nitro group in such form and in such amount that they have good light- and heat-stability, and excellent solvent and/or plasticizing action. They are soluble in a wide variety of aromatic hydrocarbons, esters, alcohols, and ketones, and the mixtures thereof which are usually employed in formulating cellulose derivative lacquers and coating compositions. They are also miscible with other cellulose derivative plasticizing agents, e. g., dimethyl phthalate, triphenyl phosphate, etc., and may be employed in combination therewith to modify certain of their physical characteristics.

The present esters, alone or in combination with other materials, are incorporated in cellulose derivative compositions as plasticizing agents in the same general manner as the plasticizing agents heretofore known. Thus, for example, molding compositions are usually prepared by heat-colloiding a mixture of the cellulose derivative and nitro-isobutyl ester in a Banbury-type mixer or on a differential speed roll mill, together with any desired modifying agents, such as resins, gums, waxes, fillers, lubricants, pigments, etc. The composition so produced may be sheeted and then molded into the desired form, and will be found to provide tough accurate moldings having excellent aging properties. Such compositions usually contain between about 10 and about 50 per cent, preferably between about 20 and about 35 per cent of the nitro-isobutyl ester, based on the weight of cellulose derivative, depending upon the particular ester and cellulose derivative employed and the properties desired in the finished molding.

Similarly, lacquers and other coating compositions usually contain a like proportion of the plasticizing agent, and are ordinarily prepared by adding the nitro-isobutyl ester to a thick viscous lacquer concentrate or "dope" formed by dissolving the cellulose derivative in a suitable solvent or solvent mixture, and thereafter diluting or cutting the "dope" with the same or different solvent or solvent mixture to obtain a lacquer suitable for spraying, brushing, dipping, etc. Alternatively, the plasticizing agent, together with modifying agents such as pigments, resins, waxes, etc., and the cellulose derivative may be colloided and thereafter dissolved in the solvent or solvent-mixture to obtain a lacquer or coating composition of desired viscosity and solids content. Regardless of the exact method employed in preparing such lacquers and coating compositions, the films and coatings deposited therefrom are characterized by good adherence, good water-resistance, toughness, good flexibility, and excellent aging characteristics.

What I claim and desire to protect by Letters Patent is:

1. A di-carboxylic acid ester of nitro-isobutyl alcohol selected from the class consisting of nitro-isobutyl oxalate and nitro-isobutyl esters having the general formula:

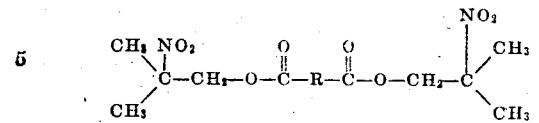

wherein R represents a radical selected from the group consisting of neutral aliphatic and aromatic radicals containing not more than eight carbon atoms.

2. A di-carboxylic acid ester of nitro-isobutyl alcohol having the general formula:

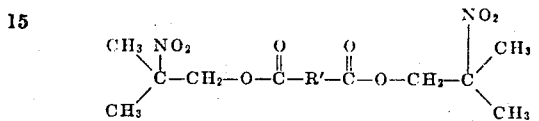

wherein R' represents a neutral aliphatic radical containing not more than eight carbon atoms.

3. A di-carboxylic acid ester of nitro-isobutyl alcohol having the general formula:

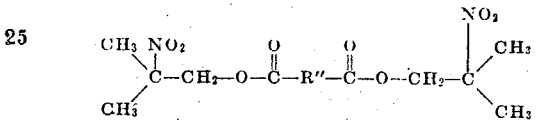

wherein R'' represents a neutral aromatic radical containing not more than eight carbon atoms.

4. Di-(nitro-isobutyl) succinate, a white crystalline solid having a melting point of about 71°–71.5° C. and the structural formula:

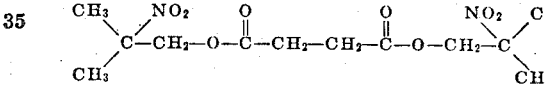

5. Di-(nitro-isobutyl) phthalate, a white crystalline solid having a melting point of about 134°–137° C. and the structural formula:

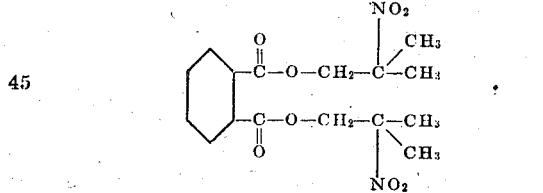

6. Di-(nitro-isobutyl) oxalate, having the structural formula:

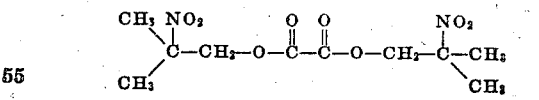

ROBERT W. LAWRENCE.